(12) United States Patent
Ryf

(10) Patent No.: US 8,822,905 B2
(45) Date of Patent: Sep. 2, 2014

(54) OPTICAL MODE COUPLERS FOR MULTI-MODE OPTICAL FIBERS

(75) Inventor: Roland Ryf, Aberdeen, NJ (US)

(73) Assignee: Alcatel Lucent, Boulogne-Billancourt (FR)

( * ) Notice: Subject to any disclaimer, the term of this patent is extended or adjusted under 35 U.S.C. 154(b) by 311 days.

(21) Appl. No.: 13/200,072

(22) Filed: Sep. 16, 2011

(65) Prior Publication Data

US 2013/0068937 A1   Mar. 21, 2013

(51) Int. Cl.
*G02F 1/035* (2006.01)

(52) U.S. Cl.
USPC ......... 250/227.11; 250/216; 385/15; 398/143

(58) Field of Classification Search
USPC ................. 250/216, 227.11, 227.23, 227.24; 385/15, 27, 28, 29, 31, 39; 398/143, 398/200
See application file for complete search history.

(56) References Cited

U.S. PATENT DOCUMENTS

| | | | |
|---|---|---|---|
| 4,768,851 | A | 9/1988 | Shaw et al. |
| 7,194,155 | B1 * | 3/2007 | Kahn et al. ............ 385/27 |
| 2002/0012498 | A1 | 1/2002 | Danziger |
| 2009/0244415 | A1 | 10/2009 | Ide |

FOREIGN PATENT DOCUMENTS

KR   2002-0082955   11/2002

OTHER PUBLICATIONS

"Fourier optics", Wikipedia,the free encyclopedia, "http://en.wikipedia.org/wiki/Fourier_optics", downloaded Aug. 31, 2011, 20 pages.
Korean Patent Abstracts 1020020082955A, Publication Date Nov. 1, 2002, 3 pgs.
PCT International Search Report, PCT/US2012/054543, International Filing Date Sep. 11, 2012, Mailing Date Feb. 27, 2013, 4 pgs.
Ryf, R. et al., "Space-division multiplexing over 10 km of three-mode fiber using coherent 6 × 6 MIMO processing", Optical Fiber Communication Conference, OSA Technical Digest (CD) (Optical Society of America, Mar. 6, 2011), paper PPDPB10, 3 pgs.
Mansour, Ayman M. et al, "Fiber Modes [Theory and Simulation]", Publication EE-0903729 of the Electrical Engineering Department at the University of Jordan, Fall 2005/2006, pp. I-III, 1-46.
Tsakiris, Todd N., "Electro-optic SLM-based architecture for ternary phase/amplitude filtering", Applied Optics, vol. 30, No. 32, Nov. 10, 1991, pp. 4596-4598.
Spatial Light Modulators XY Series-Complete, all-in one system, BNS Liquid Crystal Solutions, Data Sheet, Nov. 2010, pp. 1-12.
LCOS-SLM (Optical Phase Modulator) (X10468), Hamamatsu Photonics, Japan, http://jp.hamamatsu.com/products/other/1013/X10468/index_en.html, 7 pages, published prior to Sep. 16, 2011.
Cassarly, William James, Abstract of "A nematic liquid crystal phase and amplitude spatial light modulator for optical signal processing applications" (Jan. 1, 1990). Paper AAI9101141. http://repository.upenn.edu/dissertations/AAI9101141, 2 pages.

(Continued)

*Primary Examiner* — Kevin Pyo
(74) *Attorney, Agent, or Firm* — John F. McCabe

(57) ABSTRACT

An apparatus includes a first optical mode coupler having a spatial light modulator with a two-dimensional array of separately controllable optical phase modulators. The optical mode coupler is configurable to cause the spatial light modulator to couple a light source or light detector to an end-face of a multi-mode optical fiber via a plurality of light beams. Each of the light beams couples to a different one of optical modes in the multi-mode optical fiber.

20 Claims, 9 Drawing Sheets

(56) References Cited

OTHER PUBLICATIONS

HEO 1080 P: High-Resolution LCOS Phase Only Spat Modulator, 2009 HOLOEYE Photonics AG, http://www.holoeye.com/phase_only_modulator_heo1080p.html, 2 pages, published prior to Sep. 16, 2011.

Ryf, Roland, U.S. Appl. No. 13/234475, filed Sep. 16, 2011, "Optical System for Signal Amplification Using a Multimode Fiber".

* cited by examiner

OPTICAL MODE COUPLERS FOR MULTI-MODE OPTICAL FIBERS

BACKGROUND

1. Technical Field

The invention relates to apparatus including optical couplers, methods of making such apparatus and methods of operating such apparatus.

2. Related Art

This section introduces aspects that may be help to facilitate a better understanding of the inventions. Accordingly, the statements of this section are to be read in this light and are not to be understood as admissions about what is prior art or what is not prior art.

In an optical fiber communication system, one or more spans of optical transport fiber transport data-modulated optical carriers from an optical transmitter to an optical receiver. In each span, the optical fiber may be single-mode optical fiber or multi-mode optical fiber. Single-mode optical fiber supports, at most, a single propagating mode per wavelength channel and polarization in a wavelength range for optical communication. Multi-mode optical fiber may support multiple spatial propagating modes per wavelength channel and polarization in a wavelength range for optical communication. Thus, multi-mode optical fiber often has a potential to concurrently carry, in the same wavelength channel and polarization, multiple data streams by using multiple spatial propagating modes.

Herein, a multi-mode optical fiber is an optical fiber having an orthogonal basis of propagating optical modes, at a frequency in an optical telecommunication band, e.g., the C, L, or S band, wherein the basis includes, at least, two modes with different intensity profiles on a transverse cross-section of the optical fiber. Some multi-mode optical fibers have an orthogonal basis with, at least, four propagating optical modes. Some multi-mode optical fibers have, at least, one such propagating optical mode for which the electric or magnetic field has a magnitude that varies with azimuthal angle over the transverse cross section. A conventional single mode optical fiber is not a multi-mode fiber even though such an optical fiber may have propagating optical modes with different polarizations.

SUMMARY

Various embodiments provide methods and apparatus that optically end-couple light into or out of different optical modes of multi-mode optical fibers. In particular, the apparatus include spatial light modulators that spatially phase-modulate light beams to end-couple the light beams to selected optical modes of the multi-mode optical fibers.

An embodiment of a first apparatus includes a spatial light modulator, an electronic controller, and input or output optics. The spatial light modulator has a two-dimensional array of separately controllable optical phase modulators to phase-modulate light incident on the spatial light modulator. The electronic controller is configurable to operate the spatial light modulator to transmit light beams such that each of the light beams is modulated by a corresponding different spatial phase pattern. The output or input optics is configured to direct light between an end-face of a multi-mode optical fiber and the spatial light modulator. The electronic controller is configured to operate the spatial light modulator such that each of the light beams preferentially couples to a different one, of optical modes of a set thereof for the multi-mode optical fiber.

In some embodiments or the above apparatus, the output or input optics may be configured to demagnify a portion of a surface of the spatial light modulator at the end-face.

In some embodiments of any of the above apparatus, the output or input optics may be configured to demagnify the portion of the surface of the spatial light modulator at the end-face by at least a factor of three.

In some embodiments of any of the above apparatus, one of the optical modes of the set has a different angular momentum than another of the optical modes of the set.

In some embodiments of any of the above apparatus, each optical mode of the set is a different actual optical propagation mode for the multi-mode optical fiber.

In some embodiments of any of the above apparatus, the surface of the spatial light modulator may be located on or near a focal plane of the output or input optics.

In some embodiments of any of the above apparatus, the apparatus may further include another spatial light modulator having a two-dimensional array of separately controllable optical phase modulators to phase-modulate light incident on another spatial light modulator. In such embodiments, the electronic controller is configurable to operate the another spatial light modulator to transmit a plurality of other light beams such that each of the other light beams is modulated by a corresponding different spatial phase pattern. In such embodiments, the apparatus includes an optical element configured to couple the light beams and the other light beams to the end-face of the multi-mode optical fiber. In any such embodiments, the two spatial light modulators may be configured to output light beams having linear polarizations. In any embodiments of this paragraph, the apparatus may further include first and second optical data modulators coupled to transmit respective first and second data modulated optical carriers to respective first and second ones of the spatial light modulators such that said first and second data modulated optical carriers are transmitted to different optical modes in the multi-mode optical fiber. Alternatively, in any other embodiments of this paragraph, the apparatus may further include first and second optical data demodulators coupled to receive respective first and second data modulated optical carriers from respective first and second ones of the spatial light modulators such that said first and second data modulated optical carriers are received from light of different optical modes in the multi-mode optical fiber.

A second apparatus includes a first optical mode coupler having a spatial light modulator with a two-dimensional array of separately controllable optical phase modulators. The optical mode coupler is configurable to cause the spatial light modulator to couple a light source or light detector to an end-face of a multi-mode optical fiber via a plurality of light beams. Each of the light beams couples to a different one of optical modes in the multi-mode optical fiber.

In some embodiments, the second apparatus may further include a second optical mode coupler having a second spatial light modulator with a two-dimensional array of separately controllable optical phase modulators. The second optical mode coupler is configurable to cause the second spatial light modulator to couple a second light source or light detector to the end-face of a multi-mode optical fiber via a plurality of second light beams. Each of the second light beams couples to a different one of optical modes in the multi-mode optical fiber. In some such embodiments, the apparatus may be configured such that the first and second light beams have different linear polarizations at the end-face. In some embodiments of this paragraph, the apparatus may be configured such that the first and second light beams couple to relatively orthogonal ones of the optical modes in the multi-mode optical fiber.

In any embodiments of the second apparatus, the apparatus may be configured to couple light from a portion of an input or output surface of the spatial light modulator to the end-face. The portion has a lateral dimension that is at least three times as big as a diameter of the end-face.

In any embodiments of the second apparatus, one of the optical modes may have a different angular momentum than another of the optical modes.

In any embodiments of the second apparatus, the first light source or light detector may include a first optical data transmitter, and the second light source or light detector may include a second optical data transmitter.

In any embodiments of the second apparatus, the first light source or light detector may include a first optical data receiver, and the second light source or light detector may include a second optical data receiver.

DETAILED DESCRIPTION OF ILLUSTRATIVE EMBODIMENTS

Herein, various optical devices may be configured, e.g., to operate at wavelengths in an optical telecommunications band, e.g., the C, L, and/or S bands.

Figure 1:
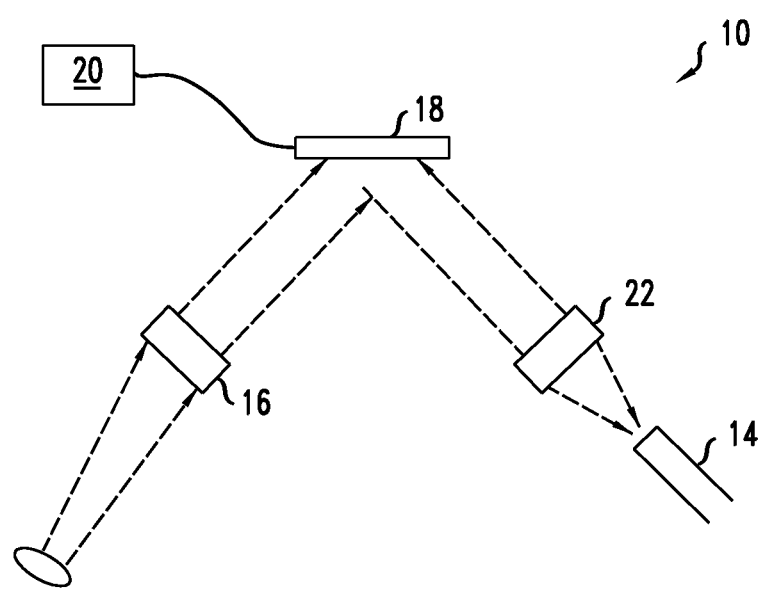
FIG. 1 is a block diagram schematically illustrating an optical mode coupler configured to preferentially end-couple light into or out of one or more optical modes of a multi-mode optical fiber.

FIG. 1 schematically illustrates an optical mode coupler 10 configurable to selectively couple a light source or light detector 12 to one or more optical modes of a multi-mode optical fiber 14. The optical mode coupler 10 includes input optics 16, a spatial light modulator (SLM) 18, an electronic controller 20 and output optics 22.

For simplicity, the optical mode coupler 10 is described below for configurations in which the light source or light detector 12 is a light source, which is indicated by reference numeral 12. Persons of ordinary skill in the art would understand that the optical mode coupler 10 would function similarly whether the element 12 is a light source such as a laser or an optical data modulator or is a light detector such as a photodetector or an optical data demodulator. For example, such different embodiments would be understood by a person of ordinary skill in the relevant arts to be related by a reversal of a direction of light propagation to, from, and within the optical mode coupler 10, e.g., exchanging functions of optical inputs and optical outputs, and an exchange of a light source and a light detector.

In various embodiments, the optical mode coupler 10 is capable of all-optically coupling of the element 12 preferentially to a selected proper subset of the optical mode(s) of a set of optical modes for the multi-mode optical fiber 14. Here, the optical modes of the set are relatively orthogonal modes for the multi-mode optical fiber 14.

The input optics 16 directs a light beam from the light source 12 to an input surface of the spatial light modulator (SLM) 18. The input optics 16 may collimate a portion of the light beam from the optical output of the light source 12, e.g., an end-face of a single-mode optical fiber, onto a portion of the input surface of the SLM 18. For example, the input optics 16 may produce a light beam whose cross-sectional diameter is directed onto a substantial portion of an input surface of the SLM 18. The input optics 16 may be a passive optical system, e.g., a lens and/or mirror system, and may include passive optical element(s) that redirect the light from the light source 12.

The SLM 18 is configurable to spatially phase-modulate wave fronts of a light beam directed to the input surface of the SLM 18 by the input optics 16 and to thereby produce a modulated light beam outgoing from an output surface of the SLM 18. The SLM 18 has a two-dimensional (2D) array of separately controllable optical phase modulators. In various embodiments, the SLM 18 may phase-modulate light by transmitting the light through the 2D array of optical phase modulators or reflecting light from the 2D array of optical phase modulators. In the SLM 18, each optical phase modulator may include, e.g., a controllable liquid crystal cell or a translatable micro-electro-mechanical system (MEMS) mirror. For example, the SLM 18 may include a commercially available liquid crystal on semiconductor (LCOS) 2D SLM, which is configured for applying spatially varying phase-modulation, or a commercially available 2D array of MEMS controlled micro-mirrors, which are able to be separately translated.

In various embodiments, the separately controllable optical phase modulators of the SLM 18 may be spaced approximately uniformly or non-uniformly in the 2D array. For example, the centers of the individual optical phase modulators may be located at nodes of a uniform 2D lattice so that neighboring individual optical phase modulators are about equally spaced.

In various embodiments, the separately controllable or individual optical phase modulators of the SLM 18 may have substantially the same operational properties or may have different operational properties. For example, different individual optical phase modulators of the SLM 18 may produce the same or different amounts of optical loss on portions of a light beam incident thereon. Indeed, the amount of such insertion loss of the individual optical phase modulators may be spatially modulated over the 2D array in a prefixed manner to partially compensate for the different intensities of the portions of the light beam incident from the light source 12. For example, the individual optical phase modulators may have different input areas to produce a spatially modulated loss that partially compensates for a Gaussian-like intensity variation across the cross section of light beam, which is incident on the input surface of the SLM 18 from the light source 12.

The electronic controller 20 is electrically connected to control the individual optical phase shifters of the SLM 18. For example, the electronic controller 20 is able to configure the individual optical phase shifters of the SLM 18 to modulate selected spatial phase pattern(s) onto the wave fronts of the incident light beam. The electronic controller 20 may be able to reconfigure the individual optical phase modulators to modulate a different spatially varying, phase patterns onto the wave fronts of the light beam incident onto the SLM 18, e.g., so that the light beam can be reconfigured to couple to different selected optical mode(s) of the multi-mode optical fiber 14.

The output optics 22 directs light from a portion of the output surface of the SLM 18 onto an end-face of the multi-mode optical fiber 14. The output optics 22 may be a passive optical system, e.g., including a lens and/or mirror system.

In some embodiments, the output optics 22 may be located and oriented such that a luminous portion of the output surface of the SLM 18 is approximately imaged on the end-face of the multi-mode optical fiber 14. In such embodiments, the output surface of the SLM 18 and the end face of the multi-mode optical fiber 14 may be located on or near conjugate planes of the output optics 22. For example the SLM 18 and the end face of the multi-mode optical fiber 14 may be located adjacent to the nearest ones of the conjugate planes to within 20 percent or less and preferably to within 10 percent or less of the distances of said nearest ones of the conjugate planes from an optical center of the output optics 22. In some such embodiments, the output optics 22 may also provide demagnification to approximately image the luminous portion of the output surface of the SLM 18 onto a smaller end-face of the multi-mode optical fiber 14 and/or a portion thereof that should be illuminated to excite the above-discussed selected optical mode(s) of the multi-mode optical fiber 14. The output optics 22 may also demagnify the luminous portion of the output surface of the SLM 18, e.g., by a factor of 3 or more or even by a factor of 5 or more, in the approximate image on the end-face of the multi-mode optical fiber 14. Such demagnification may enable the SLM 18 to produce higher resolution images on an end-face of the multi-mode optical fiber 14 having a small area.

In other embodiments, the output optics 22 is located and oriented to approximately image a Fourier transform of a luminous portion of the output surface of the SLM 18 on the end-face of the multi-mode optical fiber 14. In such embodiments, the output surface of the SLM 18 and the end face of the multi-mode optical fiber 14 may be located on or near the focal plane(s) of the output optics 22. For example, the output surface of the SLM 18 and the end face of the multi-mode optical fiber 14 may be each located adjacent to the nearest focal plane to within 20 percent or less and preferably to within 10 percent or less of the distance of the focal length from an optical center of the output optics 22. In such embodiments, the end-face of the multi-mode optical fiber 14 may also provide spatial filtering of the Fourier transform of the luminous portion of the output surface of the SLM 18. In particular, the end-face may be small enough so that bright spots produced on the second focal plane of the output optics 22 by a regular 2D lattice structure of the SLM 18 are not incident on the end-face.

In various embodiments, the optical mode coupler 10 may be configured to output light beams whose relative phases and relative amplitudes have spatial dependencies that substantially match those of one or more selected optical modes on the end-face of the multi-mode optical fiber 14. The different optical modes of the set may be, e.g., relatively orthogonal optical modes. The phase and amplitude of the output light may approximately match those of selected linear propagating (LP) or may approximately match those of actual propagating optical mode(s) on the end-face of the multi-mode optical fiber 14. The approximate matching of spatial phase and amplitude variations in the output light beam and selected optical propagating mode(s) may be produced by spatial phase modulation of the light beam incident on the SLM 18.

Figure 2:
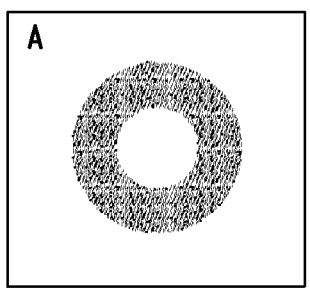
FIG. 2 schematically illustrates transverse amplitude profiles of some propagating optical modes of an example multi-mode optical fiber having an annular optical core.
Figure 2:
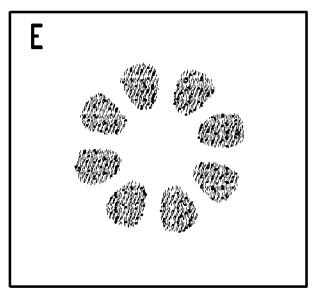
Figure 2:
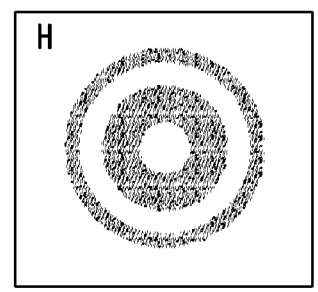
Figure 2:
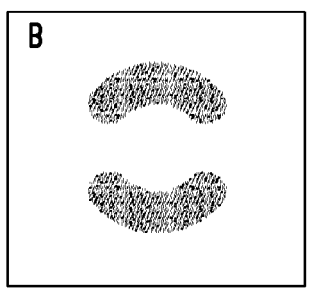
Figure 2:
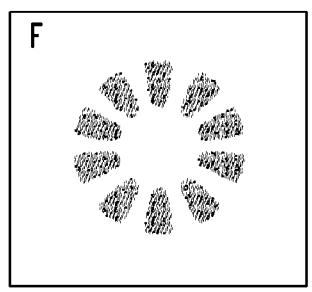
Figure 2:
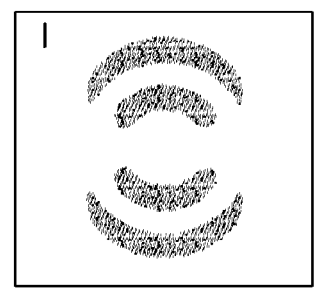
Figure 2:
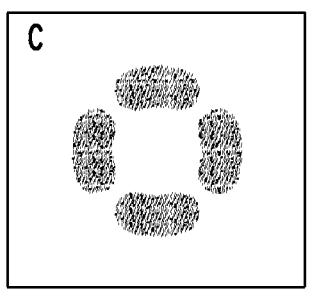
Figure 2:
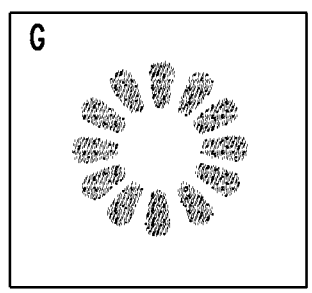
Figure 2:
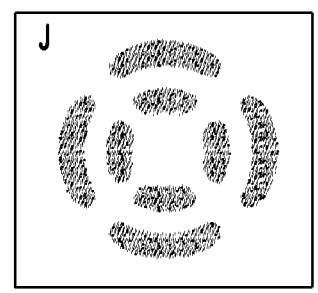
Figure 2:
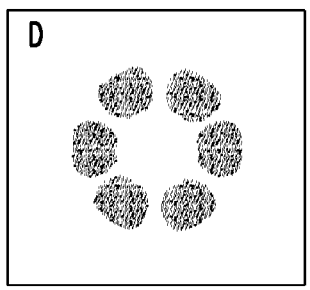

FIG. 2 schematically illustrates spatial amplitude profiles of relatively orthogonal propagating optical modes A, B, C, D, E, F, G, H, I, and J for an example of a multi-mode optical fiber with an annular optical core. In FIG. 2, relatively large amplitude regions are indicated via dark regions and relatively small amplitude regions are indicated via white regions. Phases of some of the propagating optical modes A-J have a nontrivial winding dependency around the axis of the multi-mode optical fiber, e.g., corresponding to nonzero angular momenta. To end-couple preferentially to selected combinations of such optical modes or to selected combinations of other optical modes whose fields have complex transverse spatial dependencies, some embodiments of the electronic controller 20 may be configured to operate the SLM 18 to produce spatially varying, phase modulation patterns on the wave fronts of light incident thereon.

Figure 3:
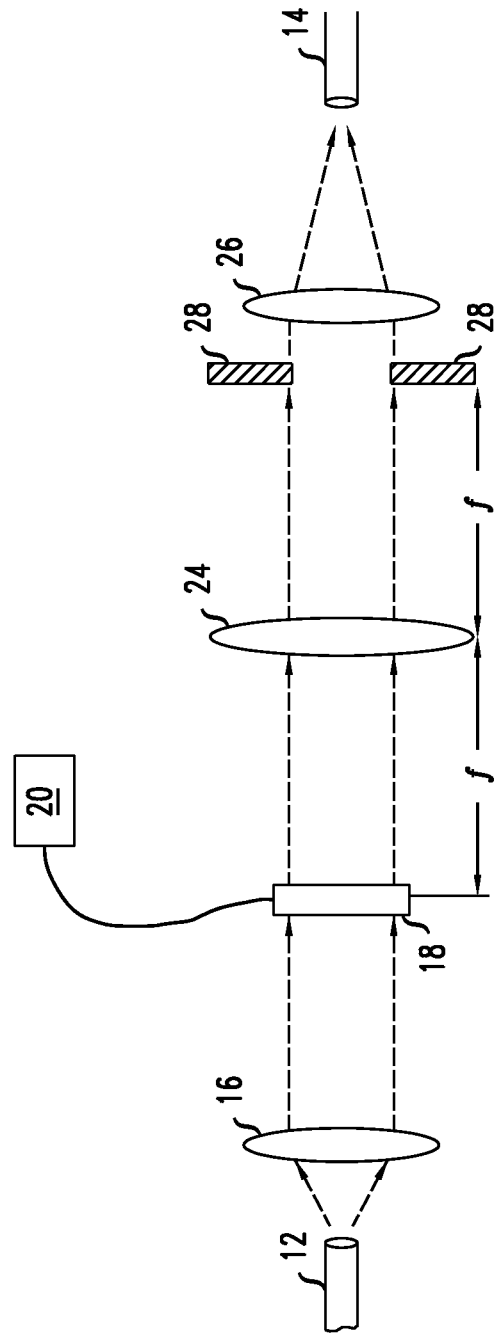
FIG. 3 is a block diagram illustrating one embodiment of the optical mode coupler of FIG. 1 that combines spatial phase-modulation with spatial filtering.

FIG. 3 illustrates a specific embodiment 10' of the optical mode coupler 10 of FIG. 1 that combines spatial phase modulation with spatial filtering. The optical mode coupler 10' includes the input optics 16, SLM 18, electronic controller 20, and output optics 22.

In the optical mode coupler 10', the input optics 16, SLM 18, and electronic controller 20 may be configured as described for the optical mode coupler 10 of FIG. 1.

In the optical mode coupler 10', the output optics 22 includes a first converging optical lens or mirror system 24, a second converging optical lens or mirror system 26, and an optional optical aperture stop 28. The converging optical lenses or mirror systems 24, 26 form an approximate image of a portion of the output surface of the SLM 18 on the end-face of the multi-mode optical fiber 14. The second converging optical lens or mirror system 26 and/or the optional optical aperture stop 28 provide spatial filtering.

To provide spatial filtering, the elements of the optical mode coupler 10' are typically specially spatially positioned, and the optical aperture formed by the second converging lens or mirror 26 and/or the optional optical aperture stop 28 is constructed to have a specific spatial form. With respect to the special spatial positioning, the output surface of the SLM 18 is located on or near a focal plane of the first converging lens or mirror system 24, and the second converging lens or mirror system 26 and/or the optional optical aperture stop 28 is located on or near a focal plane of the first converging lens or mirror system 24. With respect to the special spatial form, the second converging lens or mirror system 26 and/or the optional optical aperture stop 28 may be configured to block specific higher order bright spots of the output surface of the SLM 18 that the first converging lens or mirror system 24 produces on the Fourier transform plane.

The specific higher order bright spots are produced by the 2D array structure of the optical phase shifters of the SLM 18. The positions of said special higher order spots would be readily determinable by persons of ordinary skill in the relevant arts based on spacing distances between centers of individual optical phase modulators in the 2D array of the SLM 18. The specific higher order spots are typically on a regular grid centered around the center of the Fourier image of the output surface of the SLM 18. Thus, in some embodiments, the special higher order bright spots may be filtered out, because the spots are positioned outside of the physical aperture of the second converging lens or mirror system 26 or the optional optical aperture stop 28.

Figure 4:
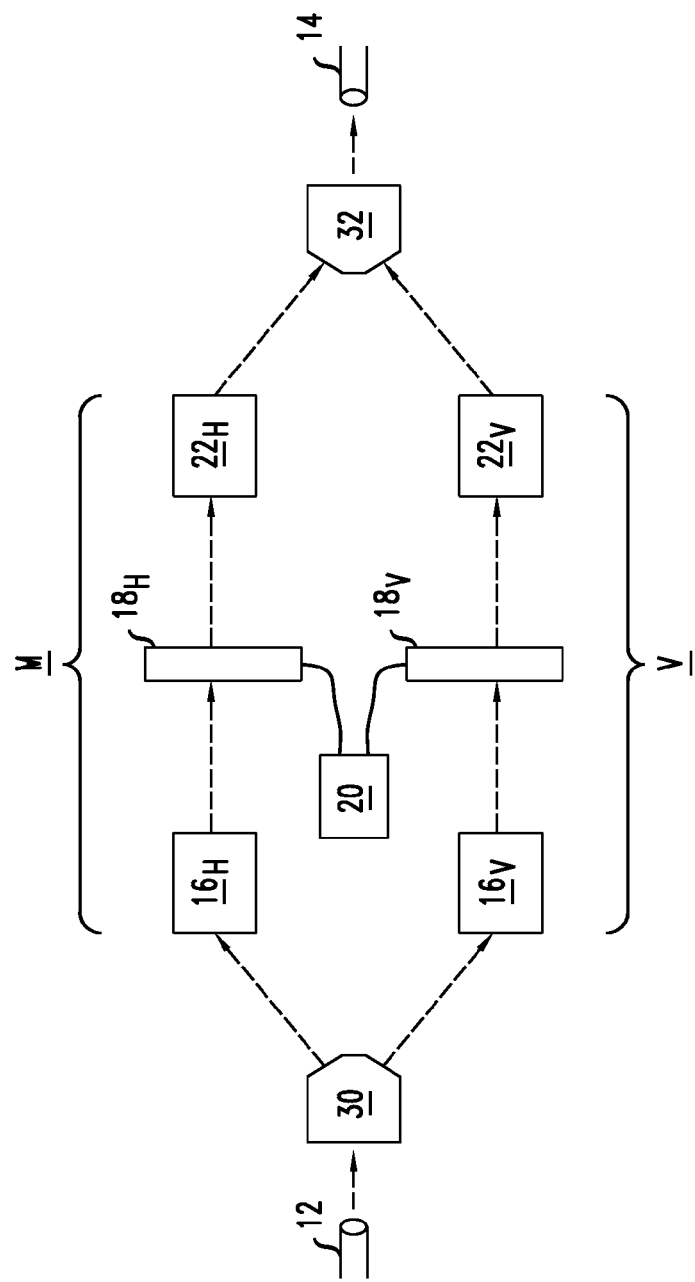
FIG. 4 is a block diagram schematically illustrating an optical mode coupler that separately processes orthogonal linear polarizations of received light with two optical mode couplers according to FIG. 1 or 3.

FIG. 4 illustrates an optical mode coupler 10" that is constructed to separately process relatively orthogonal linear polarizations of light. The optical mode coupler 10" includes parallel optical sequences H and V, first and second polarization beam splitters 30, 32, and the electronic controller 20.

In the optical mode coupler 10", each optical sequence H, V includes an input optics $16_H$, $16_V$, an SLM $18_H$, $18_V$, and an output optics $22_H$, $22_V$ for separately processing the two relatively orthogonal linear polarization components of light. The input optics $16_H$, $16_V$; SLMs $18_H$, $18_V$; and output optics $22_H$, $22_V$ may be configured similarly to the respective input optics 16, SLM 18, and output optics 22 in FIGS. 1 and/or 3 except as described below.

In the optical mode coupler 10", the input optics $16_H$ of the H optical sequence receives light of one linear polarization from the first polarization beam splitter 30, and the input optics $16_V$ of the V optical sequence receives light of a relatively orthogonal linear polarization from the first polarization beam splitter 30.

In the optical mode coupler 10", each SLM $18_H$, $18_V$ is configurable to phase modulate, e.g., in a spatially varying manner, light of the linear polarization incident thereon. Thus, each SLM $18_H$, $18_V$ is configured to output a spatially phase-modulated light beam of one linear polarization.

In the optical mode coupler 10", the electronic controller 20 is connected to control each of the SLMs $18_H$, $18_V$. Thus, the electronic controller 20 is configured to cause each SLM $18_H$, $18_V$ to phase-modulate the wave fronts of light of a corresponding linear polarization with one or more selected phase patterns, e.g., spatially varying phase patterns.

In the optical mode coupler 10", the output optics $22_H$ of the H optical sequence transmits a light beam of one linear polarization to the second polarization beam splitter 32, and the output optics $22_V$ of the V optical sequence transmits a light beam of the relatively orthogonal linear polarization to the second polarization beam splitter 32.

In the optical mode coupler 10", the second polarization beam splitter 32 superimposes the light beams of both linear polarizations from the H and V optical sequences. The polarization beam splitter 32 produces, from the superimposed light beams, an image on the end-face of the multi-mode optical fiber 14. In the image, the average amplitude, the average phase and/or the average linear polarization may vary from pixel-to-pixel. In each such image, the amplitude, phase and linear polarization may be set so that light thereof preferentially excites selected optical mode(s) for the multi-mode optical fiber 14, e.g., actual propagating optical modes therein.

In various embodiments, the optical phase modulators of the SLM(s) 18, $18_H$, $18_V$ may be configured, i.e., by the electronic controller 20, to phase-modulate the wave fronts of the light received from the input optics 16, $16_H$, $16_V$ for preferentially coupling to selected optical mode(s) of the multi-mode optical fiber 14. The SLM(s) 18, $18_H$, $18_V$ may phase-modulate incident wave fronts, e.g., planar wave fronts, to produce output light beam(s) whose spatial variations in phase, amplitude, and polarization approximately match those of the selected optical mode(s) on the near end-face of the multi-mode optical fiber 14. In particular, the optical mode couplers 10, 10', 10" may be configured to improve or approximately optimize the coupling of such light into the selected optical mode(s) of the multi-mode optical fiber 14 and/or may be configured to reduce or approximately minimize the coupling of such light into remaining unselected optical mode(s) of the multi-mode optical fiber 14.

In some embodiments, the optical mode coupler 10" is configured or configurable to preferentially couple light from the optical source 12 into selected actual optical propagating mode(s) of the multi-mode optical fiber 14. Some such actual optical propagating modes may have a polarization that varies spatially over the cross section of the multi-mode optical fiber 14, and the optical mode coupler 10" may be configurable to output light whose polarization varies in a substantially matching manner over the end-face of the multi-mode optical fiber 14. Indeed, the optical mode coupler 10" may provide the ability to separately phase-modulate light of relatively orthogonal linear polarizations and to superpose such separately phase-modulated light to produce an image on the end-face of the multi-mode optical fiber 14. In such an image, the polarization, the amplitude, and the phase can substantially be separately and selectively configured by the optical mode coupler 10", i.e., in a pixel-to-pixel manner, over the end-face of the multi-mode optical fiber 14. For that reason, the optical mode coupler 10" may provide an improved or approximately optimized coupling of light into selected actual optical propagating mode(s) of the multi-mode optical fiber 14 and/or may be configured to reduce or approximately minimize the coupling of such light into unselected actual optical propagating mode(s) of the multi-mode optical fiber 14.

Figure 5:
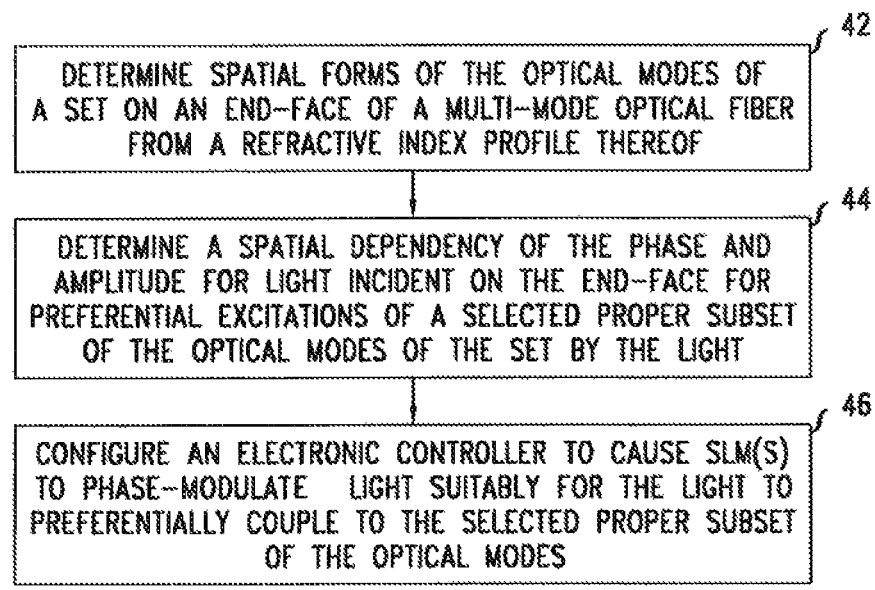
FIG. 5 is a flow chart schematically illustrating a method for making some optical mode couplers that preferentially couple light into or out of selected optical mode(s) of a multi-mode optical fiber, e.g., the optical mode couplers of FIGS. 1, 3, and 4.

FIG. 5 illustrates a method 40 for constructing specific embodiments of the optical couplers 10, 10', 10", which preferentially transmit light into selected optical mode(s) of a set of optical modes for the multi-mode optical fiber 14. For example, the method 40 may be used to configure the electronic controller 20 of the optical couplers 10, 10', 10" of FIGS. 1, 3, and 4.

The method 40 includes determining the spatial dependencies of the optical modes of the set on the end-face of the multi-mode optical fiber 14 based on the refractive index profile of the multi-mode optical fiber 14 (step 42). Typically, the step 42 involves finding spatial amplitude and spatial phase dependencies and possibly a spatial linear polarization dependency of the optical modes of the set in the multi-mode optical fiber 14. Here, the amplitude, phase, and polarization spatial dependencies are those of the optical fields of an optical mode, e.g., the spatial dependencies of the optical mode's electric and/or magnetic fields. A person of ordinary skill would be able to readily determine such spatial dependencies of the optical modes of such a set by using known methods for determining the electric and magnetic fields of optical modes. For example, the project report "Fiber Modes [Theory and Simulation]" by Ayman M. Mansour et al (Fall 2005/2006), publication EE-0903729 of the Electrical Engineering Department at the University of Jordan, which is incorporated herein by reference in its entirety, describes some such methods.

The different optical modes of the set have overlap integrals over the 2D end-face of the multimode optical fiber 14, which are typically, at most, of small or negligible magnitude. Indeed, the optical modes of the set may be mutually orthogonal and may be normalized with respect to such an overlap integral so that the overlap integral also determines the magnitude of the coupling of incident light to the individual optical modes of the set in the multi-mode optical fiber 14. The optical modes of the set may be, e.g., different linearly polarized (LP) optical modes or may be, e.g., some or all of a basis set of actual propagating optical modes of the multi-mode optical fiber 14.

The method 40 includes determining the spatial dependency of the phase, ϕ(x,y), amplitude, A(x,y) for the optical field of light incident on the end-face of the multimode optical fiber 14 in order that the light preferentially excite a selected combination of one or more of the optical modes of the set (step 44). Here, Cartesian coordinates (x,y) identify points or pixels on the 2D end-face of the multi-mode optical fiber. As an example, the individual optical modes of the set may be mutually orthogonal with respect to overlap integrals there between on the end-face of the multi-mode optical fiber 14. For such a set of optical modes, light can preferentially couple to a selected one of the optical modes if the light's optical fields have amplitudes approximately proportional to those of the selected one of the optical modes on the end-face of the multi-mode optical fiber 14 and have phases approximately equal to those of the selected one of the optical modes, i.e., up to constant shifts, on the end-face of the multi-mode optical fiber 14.

The determining step 44 may optionally also involve determining local values corresponding to the light's linear polarization such that the light preferentially excites a selected combination of one or more of the optical modes of the set. For example, the determining step 44 may include determining separate spatial phase and amplitude profiles, i.e., $\{\phi_H(x,y), A_H(x,y)\}$ and $\{\phi_V(x,y), A_V(x,y)\}$, for light output to the end-face of the optical fiber 14. For example, such $\{\phi_H(x,y), A_H(x,y)\}$ and $\{\phi_V(x,y), A_V(x,y)\}$ profiles may be used to configure the respective H-polarization and V-polarization SLMs $18_H$ and $18_V$ of FIG. 4.

The method 40 includes configuring the electronic controller 20 to cause the SLM(s) 18, $18_H$, $18_V$ to phase-modulate incident light to produce a suitable output light beam for preferentially optical end-coupling to the one of or more selected optical modes of the set for the multi-mode optical fiber 14 (step 46). The electronic controller 20 is configured to cause the SLM(s) 18, $18_H$, $18_V$ to produce output light beam(s) whose optical field(s) on the 2D output surface of the SLM 18, is(are) approximately defined by:

$$A(X,Y)e^{i\phi(X,Y)}. \quad (1a)$$

In eq. (1a), Cartesian coordinates for a point on the 2D output surfaces of the SLMs 18, $18_H$, $18_V$ are written with a pair of capital letters, i.e., X and Y. Each output optics 22, $22_H$, $22_V$ forms either an image of a luminous portion of the output surface of the corresponding SLM 18, $18_H$, $18_V$ or an image or a Fourier transform of said luminous output surface on the end-face of the multi-mode optical fiber 14. Thus, either a luminous point (X,Y) on the output surface of each SLM 18, $18_H$, $18_V$ is imaged to a point (x,y) on the end-face of the multi-mode optical fiber 14 or a point of the Fourier transform of the luminous output surface of each SLM 18, $18_H$, $18_V$ is imaged to a point (x,y) on the end-face of the multi-mode optical fiber 14. In the former case, the luminous point at (X,Y) on the 2D output surface of each SLM 18, $18_H$, $18_V$ is related to the (x,y) on the 2D end-face of the multi-mode optical fiber 14 approximately as follows:

$$(X,Y)=(x/m, y/m)$$

In this case, the output optics 22, $22_H$, $22_V$ magnifies linear dimensions of luminous patterns on the output surface of the SLM 18, $18_H$, $18_V$ by a factor "m", where m is often less than one. On the 2D end-face of the multi-mode optical fiber 14, the output optics 22, $22_H$, $22_V$ typically produces an image whose optical field(s) is(are) approximately proportional to field(s):

$$A(x,y)e^{i\phi(x,y)} \quad (1b)$$

In the later case, a person of ordinary skill would understand based on the present disclosure how the output optics 22, $22_H$, $22_V$ relates optical field(s) of the luminous pattern on the output surface of the SLM 18, $18_H$, $18_V$ to the optical field(s) on the end-face of the multi-mode optical fiber 14.

To cause the SLM 18, $18_H$, $18_V$ to produce optical field(s) as defined in eq. (1a), the electronic controller 20 may operate the 2D array of individual optical phase modulators of the SLM 18, $18_H$, $18_V$ as a lower-resolution 2D array of pixels, which are indexed by the Cartesian coordinates (X, Y). Each such pixel includes a local group of locally located individual optical phase modulators of the SLM 18, $18_H$, $18_V$, and each individual optical phase modulator of the SLM 18, $18_H$, $18_V$ belongs to a single one of the local groups. In various embodiments, the individual local groups may have different sizes, e.g., having 2, 3, 4, 5, 6, 7, 8, or more relatively locally located, individual optical phase modulators of the SLM 18, $18_H$, $18_V$.

Each local group is configured by the electronic controller 20 to produce an average phase and amplitude modulation of incident light, i.e., at the lattice scale of the lower-resolution 2D array of the pixels of local groups. That is, a spatially-varying phase modulation by the optical phase modulators of each SLM 18, $18_H$, $18_V$ produces, e.g., at the lower resolution of the 2D array of pixels, which are indexed by (X,Y) coordinates, a combined spatially varying amplitude and phase modulation.

Figure 6:
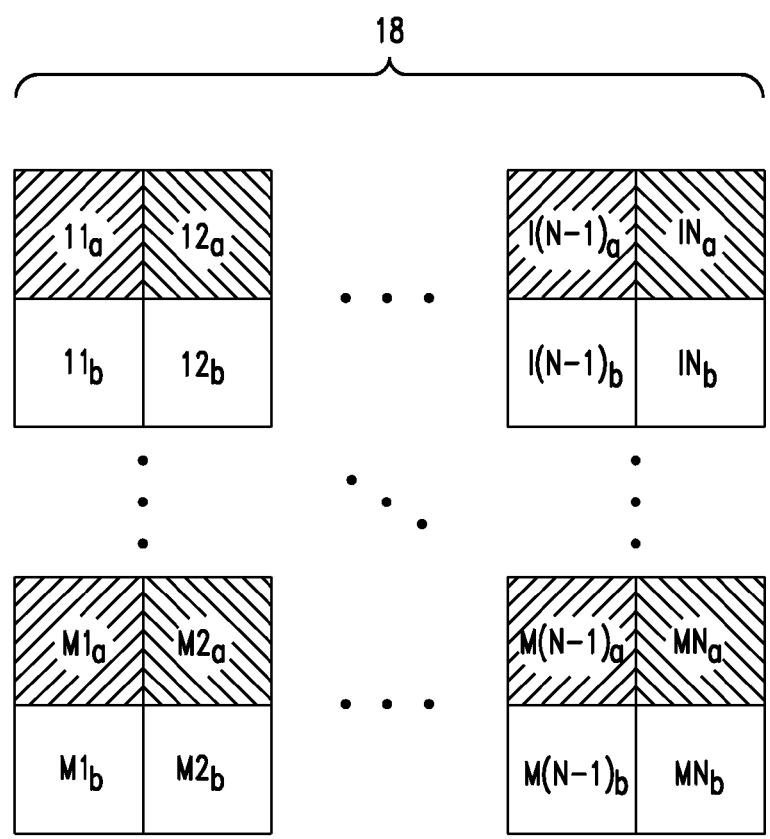
FIGS. 6 and 7 schematically illustrate alternate configurations of the spatial light modulators (SLMs) of FIGS. 1, 3A, 3B and 4 for which a spatially varying, phase modulation produces amplitude and phase modulation of light at a lower resolution.
Figure 7:
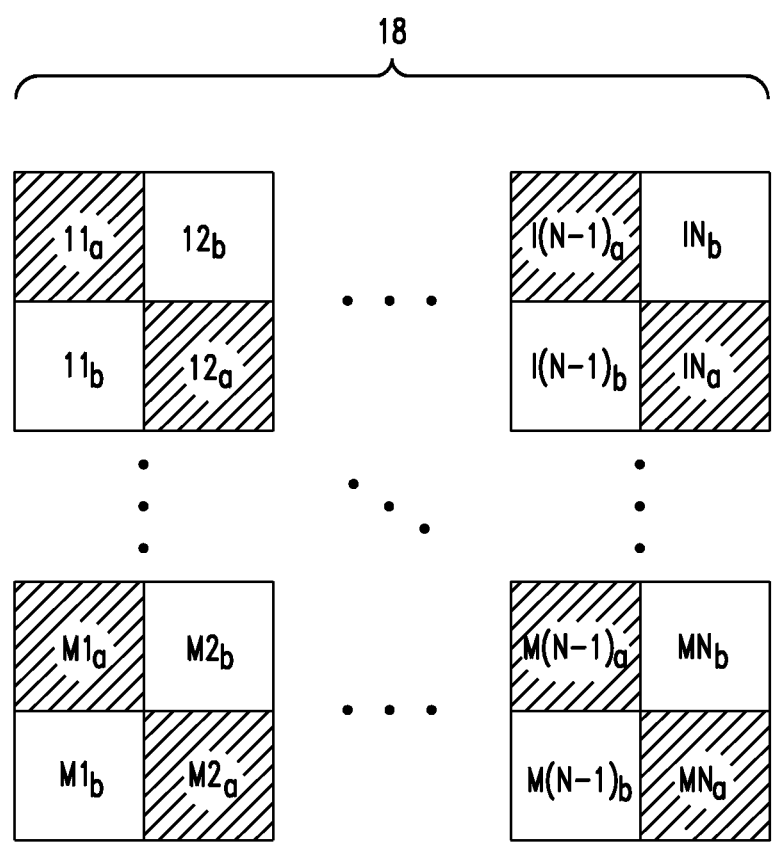

FIGS. 6 and 7 illustrate alternate example configurations for the lower-resolution 2D array of pixels over which such spatially varying amplitude and phase modulations result from a phase modulation by the SLM 18. In each example configuration, an individual pixel of the lower resolution array includes an (a, b)-indexed pair of neighboring individual optical phase modulators of the SLM 18. The pixel at a point (X,Y) includes an (a,b)-indexed pair of optical phase modulators, which are located on neighboring rows of the SLM 18. The (a,b)-indexed pair is located in the same column of the SLM 18 in the paired-row configuration illustrated in FIG. 6 and is diagonally located in a neighboring column and row of the SLM 18 in the checkerboard configuration illustrated in FIG. 6. For example, FIGS. 6-7 explicitly show the pixels of the N×M array with the (X,Y) coordinates (1,1), (1,2), (1,N−1), (1, N), (M,1), (M,2), (M,N−1), and (M,N), which include (a,b)-indexed optical phase modulators having the respective pairs of reference numerals $\{11_a, 11_b\}$, $\{12_a, 12_b\}$, $\{1(N-1)_a, 1(N-1)_b\}$, $\{1N_a, 1N_b\}$, $\{M1_a, M1_b\}$, $\{M2_a, M2_b\}$, $\{M(N-1)_a, M(N-1)_b\}$, and $\{1N_a, 1N_b\}$.

In the configurations of FIGS. 6 and 7, the electronic controller 20 configures the a-indexed and b-indexed optical phase modulators for an (a,b)-indexed pair belonging to the pixel at (X,Y) to modulate respective phases $\Omega_a(X,Y)$ and $\Omega_b(X,Y)$ on the wave fronts of the incident light beam. The phases $\Omega_a(X,Y)$ and $\Omega_b(X,Y)$ may be, e.g., defined by:

$$\Omega_a(X,Y)=\phi(X,Y)+\cos^{-1}(A(X,Y)/A_{max})+2\pi K_a \quad (2a)$$

and $$\Omega_b(X,Y)=\phi(X,Y)-\cos^{-1}(A(X,Y)/A_{max})+2\pi K_b. \quad (2b)$$

Here, $K_a$ and $K_b$ are integers whose values are fixed to enable the individual optical phase modulators of the SLM 18 to be positioned within their operating ranges, and $A_{max}$ may be, e.g., a maximum of the amplitude A(x, y) on the output surface of the SLM 18 or may be another constant value. The values of $K_a$ and $K_b$ do not affect the spatially phase-modulated light output by the SLM 18. Based on eqs. (2a)-(2b), the complex value of the optical field, averaged over the pixel at (X,Y), is proportional to:

$$e^{i\Omega_a(X,Y)} + e^{i\Omega_b(X,Y)} = e^{i\varphi(X,Y)}\left[e^{i\cos^{-1}(A(X,Y)/A_{max})} + e^{-i\cos^{-1}(A(X,Y)/A_{max})}\right] \quad (3)$$
$$= e^{i\varphi(X,Y)}[2\cos(\cos^{-1}(A(X,Y)/A_{max}))]$$
$$= (2/A_{max})A(X,Y)e^{i\varphi(X,Y)}$$

From Eq. (3), the person of ordinary skill in the relevant arts would understand that outgoing light at the output surface of the SLM 18, which may be phase-modulated in a spatially varying manner, will appear to be both phase and amplitude modulated as in eq. (1a) when averaged over individual ones of the pixels of a lower-resolution 2D array, i.e., the pixels indexed by coordinates (X,Y). Thus, local phase modulations as illustrated by eqs. (2a)-(2b) and FIG. 5 or 6, produce a discretized approximation of an optical field having the form C A(X,Y)$e^{i\Phi(X,Y)}$, where C is a constant, at the resolution-scale of the 2D array of the pixels indexed by (X,Y) coordinates.

For the configurations of FIGS. 6 and 7, each of the SLMs 18, 18$_V$, 18$_H$ of FIGS. 1, 3, and 4 can be operated according to eqs. (2a)-(2b) to output light whose amplitude and phase satisfy a suitable eq. (1b), i.e., when averaged over individual ones of the pixels, for the selected optical mode(s) on the end-face of multi-mode optical fiber 14.

In the optical mode coupler 10" of FIG. 4, the SLM 18$_V$ and the SLM 18$_H$ may be separately configured to output modulated light beams for the respective V and H linear polarization components of the selected optical mode(s) of the multi-mode optical fiber 14. That is, the SLM 18$_V$ may be configured by the electronic controller 20 to phase-modulate a light beam according to eqs. (2a)-(2b) with A(X,Y)=$A_V$(X,Y) and $\phi$(X,Y)=$\phi_V$(X,Y) on its output surface, and the SLM 18$_H$ may be configured by the electronic controller 20 to phase-modulate a light beam according to eqs. (2a)-(2b) with A(X,Y)=$A_H$(X,Y) and $\phi$(X,Y)=$\phi_H$(X,Y) on its output surface. Here, $A_V$(x,y) and $\phi_V$(x,y) are the amplitude and phase of the V linear polarization component of the selected optical mode(s) on the end face of the multi-mode optical fiber 14, and $A_H$(x,y) and $\phi_H$(x,y) are the amplitude and phase of the H linear polarization component of the selected optical mode(s) on the end face of the multi-mode optical fiber 14.

Figure 8:
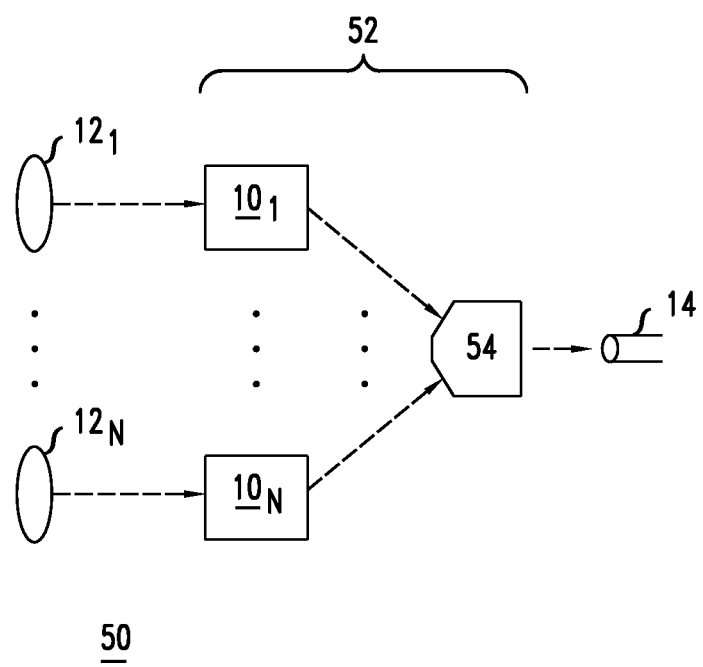
FIG. 8 is a block diagram schematically illustrating an optical device that includes a reconfigurable N×1 optical mode coupler for coupling N light sources or light detectors, in parallel, to N corresponding optical modes of a multi-mode optical fiber.

FIG. 8 schematically illustrates an optical device 50 that includes a reconfigurable N×1 optical mode coupler 52 for coupling N light sources or light detectors 12$_1$-12$_N$, in parallel, to preferentially to N corresponding optical modes of the multi-mode optical fiber 14. The reconfigurable N×1 optical mode coupler 52 includes N 1×1 reconfigurable optical mode couplers 10$_1$-10$_N$ and a passive N×1 optical coupler 54.

Each 1×1 reconfigurable optical mode coupler 10$_1$-10$_N$ has an optical input coupled to a corresponding one of the light sources or light detectors 12$_1$-12$_N$ and has an optical output connected to a corresponding optical input of the passive N×1 optical coupler 54. Each 1×1 reconfigurable optical mode coupler 10$_1$-10$_N$ may be constructed similarly to one of the 1×1 optical mode couplers 10, 10', 10" of FIGS. 1, 3, and 4.

The passive N×1 optical coupler 54 superimposes the N light beams received at its N optical inputs and directs the resulting combined light beam to the end-face of the optical fiber 14. Due to this superposition, images of luminous parts of the output surfaces of the SLMs in the N 1×1 optical couplers 10$_1$-10$_N$ or Fourier transforms of the luminous parts of said output surfaces can be formed in parallel by the passive n×1 optical coupler 54 on the end-face of the multi-mode optical fiber 14. The passive N×1 optical coupler 54 may be a conventional passive optical system for forming such a superposition of different light beams. For example, the passive N×1 optical coupler 54 may be formed with conventional mirrors, lenses, polarization splitters, etc.

A 2×1 embodiment of the passive N×1 optical coupler 54 may include, e.g., one or more ½ or partially silvered mirrors located so that one 1×1 optical mode coupler 10$_1$-10$_N$ can illuminate a backside of the ½ or partially silvered mirror and another 1×1 optical mode coupler 10$_1$-10$_N$ can illuminate a front side of the ½ or partially silvered mirror. By combined transmission and reflection, such a ½ or partially silvered mirror can, in parallel, redirect light beams from both such 1×1 optical mode couplers 10$_1$-10$_N$ to the end-face of the multi-mode optical fiber 14.

Figure 9:
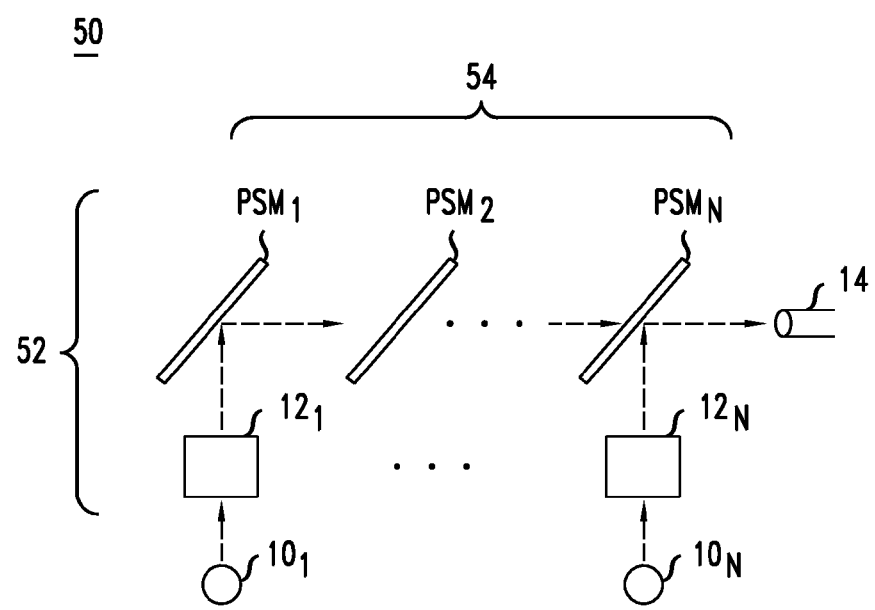
FIG. 9 is a block diagram illustrating one embodiment for the N×1 passive optical coupler of FIG. 8.

One example embodiment of the passive N×1 optical coupler 54 of FIG. 8 may include a cascade of N or (N−1) partially silvered mirrors, e.g., as illustrated for N such mirrors PSM$_1$-PSM$_N$ with N greater than 2 in FIG. 9. In such an embodiment, each 1×1 optical mode coupler 10$_1$-10$_N$ may direct output light there from to a front side of a corresponding one of the partially silvered mirrors PSM$_1$-PSM$_N$. In such a cascade, each partially silvered mirror PSM$_1$-PSM$_N$ may also be located to direct light reflected from its front side either to the backside of the next partially silvered mirror PSM$_1$-PSM$_N$ of the cascade or to the end-face of the multi-mode optical fiber 14.

Persons of ordinary skill in the relevant arts would understand from the present disclosure that other conventional passive optical devices may be used to construct the passive N×1 optical coupler 54 of FIG. 8.

Referring to FIG. 8, the optical device 50 may be an optical data transmitter in some embodiments. In such embodiments, each of the N light sources or light detectors 12$_1$-12$_N$ may be a separate optical data transmitter that generates a data modulated optical carrier, e.g., from a received digital data stream(s). For example, each such optical transmitter may include conventional electrical and optical devices for modulating an optical carrier in one or multiple wavelength channels with the digital data stream(s). In such embodiments, the passive N×1 optical coupler 54 may selectively and reconfigurably multiplex the data-modulated optical carriers from different ones of the N optical transmitters onto different ones of the optical modes of the multi-mode optical fiber 14.

Referring to FIG. 8, the optical device 50 may be an optical data receiver in some alternative embodiments. In such embodiments, each of the N optical sources or detectors 12$_1$-12$_N$ may be a separate optical receiver for a demodulated digital data streams, e.g., from a received data modulated, multi-mode, optical carrier. For example, each such optical receiver may include conventional electrical and optical devices for demodulating digital data stream(s) from a data-modulated optical carrier of a single one of the optical modes, which may include one or multiple wavelength channels. In such an embodiment, the passive N×1 optical coupler 54 demultiplexes the data-modulated, multi-mode, optical carrier to separate the light of different ones of the optical modes of the multi-mode optical fiber 14 and directs the light received on the different ones of the optical modes to different ones of the N optical receivers.

Various embodiments of the optical mode couplers 10, 10' 10" of above FIGS. 1, 3, and 4 may be used in optical devices similar to the optical devices described in the U.S. Patent Application, titled "OPTICAL SYSTEM FOR SIGNAL AMPLIFICATION USING A MULTIMODE FIBER", which is being concurrently filed by Roland Ryf on Sep. 16, 2011. This U.S. Patent Application of Roland Ryf is incorporated herein by reference in its entirety. The optical mode couplers 10, 10', 10" of FIGS. 1, 3, and 4 may, e.g., replace any of the phase masks and corresponding input and output optics of the optical amplifiers and other optical devices described in the above-incorporated U.S. Patent Application when the phase masks can function therein to preferentially couple light into various ones of the guided modes of a multi-mode optical fiber discussed therein. For example, the optical mode couplers that are described in the present application may replace some or all of the phase masks in the optical-signal couplers and/or optical-pump couplers of the above-incorporated U.S. Patent Application.

The Detailed Description of the Illustrative Embodiments and drawings merely illustrate the principles of the invention. It will thus be appreciated that those skilled in the art will be able to devise various arrangements that, although not explicitly described or shown herein, embody the principles of the inventions and are included within the claimed inventions. Furthermore, all examples recited herein are principally intended to be only for pedagogical purposes to aid in understanding the principles of the inventions and concepts contributed by the inventor to furthering the art, and are to be construed as being without limitation to such specifically recited examples and conditions. Moreover, all statements herein reciting principles, aspects, and embodiments of the inventions, as well as specific examples thereof, are intended to encompass equivalents thereof.

What is claimed is:

1. An apparatus, comprising:
a spatial light modulator having a two-dimensional array of separately controllable optical phase modulators to phase-modulate light incident on the spatial light modulator;
an electronic controller configurable to operate the spatial light modulator to transmit a plurality of light beams such that each of the light beams is modulated by a corresponding different spatial phase pattern; and
output or input optics to direct light between an end-face of a multi-mode optical fiber and the spatial light modulator; and
wherein the electronic controller is configured to operate the spatial light modulator such that each of the light beams preferentially couples to a different one of optical modes of a set thereof in the multi-mode optical fiber; and
wherein the output or input optics is configured to filter light transmitted from the spatial light modulator to the end-face by causing spatially filtering of a Fourier image from said transmitted light of a surface of the spatial light modulator.

2. The apparatus of claim 1, wherein the output or input optics is configured to demagnify a portion of the surface of the spatial light modulator at the end-face.

3. The apparatus of claim 1, wherein the output or input optics is configured to demagnify a portion of the surface of the spatial light modulator at the end-face by at least a factor of three.

4. The apparatus of claim 1, wherein one of the optical modes of the set has a different angular momentum than another of the optical modes of the set.

5. The apparatus of claim 1, wherein the surface of the spatial light modulator is located on or near a focal plane of an optical element of the output or input optics.

6. An apparatus, comprising:
a spatial light modulator having a two-dimensional array of separately controllable optical phase modulators to phase-modulate light incident on the spatial light modulator;
an electronic controller configurable to operate the spatial light modulator to transmit a plurality of light beams such that each of the light beams is modulated by a corresponding different spatial phase pattern; and
output or input optics to direct light between an end-face of a multi-mode optical fiber and the spatial light modulator; and
wherein the electronic controller is configured to operate the spatial light modulator such that each of the light beams preferentially couples to a different one of optical modes of a set thereof in the multi-mode optical fiber; and
wherein the apparatus further comprises:
another spatial light modulator having a two-dimensional array of separately controllable optical phase modulators to phase-modulate light incident on the another spatial light modulator, the electronic controller configurable to operate the another spatial light modulator to transmit a plurality of other light beams such that each of the other light beams is modulated by a corresponding different spatial phase pattern; and
an optical element configured to couple the light beams and the other light beams to the end-face of the multi-mode optical fiber.

7. The apparatus of claim 6, wherein the two spatial light modulators are configured to output light beams having linear polarizations.

8. The apparatus of claim 6, wherein the spatial light modulators are configured to transmit to the end-face of the multi-mode optical fiber light with different linear polarizations.

9. The apparatus of claim 6, further comprising:
first and second optical data modulators coupled to transmit respective first and second data modulated optical carriers to respective first and second ones of the spatial light modulators such that said first and second data modulated optical carriers are transmitted to different optical modes in the multi-mode optical fiber.

10. The apparatus of claim 6, further comprising:
first and second optical data demodulators coupled to receive respective first and second data modulated optical carriers from respective first and second ones of the spatial light modulators such that said first and second data modulated optical carriers are received from light of different optical modes in the multi-mode optical fiber.

11. An apparatus, comprising:
a first optical mode coupler comprising output or input optics and a spatial light modulator with a two-dimensional array of separately controllable optical phase modulators; and
wherein the output or input optics is configurable to cause the spatial light modulator to couple a light source or light detector to an end-face of a multi-mode optical fiber via a plurality of light beams, each of the light beams coupling to a different one of optical modes in the multi-mode optical fiber; and
wherein the output or input optics is configured to transmit light from the spatial light modulator to the end face of the multimode fiber by causing spatially filtering of a Fourier image from said transmitted light of a surface of the spatial light modulator.

12. The apparatus of claim 11, further comprising:
a second optical mode coupler having a second spatial light modulator with a two-dimensional array of separately controllable optical phase modulators, the second optical mode coupler being configurable to cause the second spatial light modulator to couple a second light source or light detector to the end-face of a multi-mode optical fiber via a plurality of second light beams, each of the second light beams coupling to a different one of the optical modes in the multi-mode optical fiber.

13. The apparatus of claim 12, wherein the apparatus is configured such that the first and second light beams having different linear polarizations at the end-face.

14. The apparatus of claim 12, wherein the apparatus is configured such that the first and second light beams couple to relatively orthogonal ones of the optical modes in the multi-mode optical fiber.

15. The apparatus of claim 11, wherein the apparatus is configured to couple light from a portion of the surface of the spatial light modulator to the end-face, the portion having a lateral dimension that is at least three times as big as a diameter of the end-face.

16. The apparatus of claim 11, wherein one of the optical modes has a different angular momentum than another of the optical modes.

17. The apparatus of claim 12, wherein the first light source or light detector includes a first optical data transmitter and the second light source or light detector includes a second optical data transmitter.

18. The apparatus of claim 12, wherein the first light source or light detector includes a first optical data receiver and the second light source or light detector includes a second optical data receiver.

19. The apparatus of claim 1, wherein the output or input optics is configured to cause filtering out of light spots on a regular grid around a center of the Fourier image.

20. The apparatus of claim 11, wherein the output optics is configured to cause filtering out of light spots on a regular grid around a center of the Fourier image.

\* \* \* \* \*